Patented Feb. 11, 1941

2,231,733

UNITED STATES PATENT OFFICE 2,231,733

POLYVINYL ACETAL RESIN COMPOSITION CONTAINING ESTERS OF ALKOXYBENZOIC ACIDS

James B. Normington and Fred C. Duennebier, Rochester, N. Y., assignors to Eastman Kodak Company, Rochester, N. Y., a corporation of New Jersey No Drawing. Application April 12, 1940, Serial No. 329,385

4 Claims. (Cl. 260—36)

This invention relates to plastic compositions, and more particularly to compositions comprising a polyvinyl acetal resin and a conditioning agent.

One object of this invention is to produce compositions of matter which may be made into permanently transparent, strong and flexible sheets or films of desired thinness which are substantially water-proof, are unaffected by ordinary photographic fluids, and possess the desired properties of a support for sensitive photographic coatings. Another object is to produce compositions which can be rolled, extruded, molded or otherwise worked into relatively thick sheets and massive plastics. A further object is to produce compositions suitable for use in lacquers, artificial silk filaments, wrapping tissues and the like. Other objects will hereinafter appear.

We have discovered that a lower alkoxybenzoic acid ester of a compound selected from the group consisting of ethylene and diethylene glycol and their lower mono-alkyl ethers and the cyclic alcohols is a useful plasticizer for polyvinyl acetal resins, increasing the flexibility and toughness of polyvinyl acetal resin films, sheets or other objects or masses containing it.

Examples of our novel plasticizers are benzyl anisate, cyclohexyl anisate, tetrahydrofurfuryl anisate, ethylene glycol mono-anisate, methoxyethyl anisate, ethoxyethyl anisate, butoxyethyl anisate, phenoxyethyl anisate, diethylene glycol di-anisate, the ethyl ether of diethylene glycol anisate, benzyl o-methoxybenzoate, cyclohexyl o-methoxybenzoate, ethylene glycol mono-o-methoxybenzoate, methoxyethyl o-methoxybenzoate, ethoxyethyl o-methoxybenzoate, butoxyethyl o-methoxybenzoate, the ethyl ether of diethylene glycol o-methoxybenzoate, benzyl p-ethoxybenzoate, tetrahydrofurfuryl p-ethoxybenzoate, methoxyethyl p-ethoxybenzoate, ethoxyethyl p-ethoxybenzoate, the benzyl ether of ethylene glycol p-ethoxybenzoate, the ethyl ether of diethylene glycol p-ethoxybenzoate, ethylene glycol mono-3:4:5-trimethoxybenzoate, methoxyethyl 3:4:5-trimethoxybenzoate, and ethoxyethyl 3:4:5-trimethoxybenzoate. They have low vapor pressure, and are remarkably stable to heat and to hydrolysis.

For the manufacture of cast films or sheets, the polyvinyl acetal resin and the plasticizer may be dissolved in a suitable solvent or solvent mixture, such, for instance, as acetone, methanol, acetone-methanol mixtures, ethylene chloride-methanol mixtures, etc., about 300 to 500 or more parts of the solvent or solvent mixture being used per 100 parts of the resin. From about 5 to 100 parts of the plasticizer may be employed, depending upon the nature of the resin and the purpose for which the sheets are to be used. Suitable proportions of the plasticizer for any resin and any purpose may be readily determined by experiment. For the manufacture of sheets suitable for photographic film base, 5 to 25 parts of plasticizer per 100 parts of resin are suitable. The resin solution is cast as a sheet, the solvent evaporated, and the sheet stripped from the casting surface.

We give, below, methods of preparing our novel plasticizers.

*Example I.*—One gram molecule of anisic acid, an excess of the monoethyl ether of ethylene glycol, 400 cc. of toluene and 2 cc. of concentrated sulfuric acid are distilled, a toluene-water azeotrope being distilled off and the toluene separated and returned to the reaction flask. When the theoretical amount of water has been removed, the solution is cooled, neutralized with dilute sodium carbonate solution, washed with water, and distilled under vacuum. The ethoxyethyl anisate formed has a boiling point of 140–145° C. at 1 mm. Hg pressure.

Methoxyethyl anisate (B. P. 135–140° C. at 1 mm.), the ethyl ether of diethylene glycol anisate (B. P. 160–165° C. at 1 mm.), butoxyethyl anisate (B. P. 157–162° C. at 1 mm.), phenoxyethyl anisate (170–175° C. at 2 mm.), benzyl anisate (B. P. 150–155° C. at 1 mm.), tetrahydrofurfuryl anisate (B. P. 160–165° C. at 1 mm.), and cyclohexyl anisate (B. P. 140–143° C. at 1 mm.) may be prepared in a similar manner, using the monomethyl ether of ethylene glycol, the monoethyl ether of diethylene glycol, the monobutyl ether of ethylene glycol, the monophenyl ether of ethylene glycol, benzyl alcohol, tetrahydrofurfuryl alcohol, and cyclohexyl alcohol, respectively, in place of the monoethyl ether of ethylene glycol.

*Example II.*—100 g. of o-methoxybenzoic acid is dissolved in a mixture of 100 g. of the monoethyl ether of ethylene glycol and 200 cc. of toluene. 1 g. of p-toluene sulfonic acid is added, and the mixture is distilled, an azeotrope of toluene and water being distilled off, separated, and the toluene returned to the reaction flask. When the theoretical amount of water has been removed, the product is worked up as in Example I. The ethoxyethyl o-methoxybenzoate formed boils at 135–140° C. at 1 mm. Hg pressure.

Methoxyethyl o-methoxybenzoate (B. P. 160–165° C. at 10 mm.), the ethyl ether of diethylene glycol o-methoxybenzoate (B. P. 137–143° C. at 2 mm.), and butoxyethyl o-methoxybenzoate (B. P. 135–140° C. at 2 mm.), may be prepared in a similar manner, using the monomethyl ether of ethylene glycol, the monoethyl ether of diethylene glycol, and the monobutyl ether of ethylene glycol, respectively, in place of the monoethyl ether of ethylene glycol.

*Example III.*—150 g. of p-ethoxybenzoic acid, 150 g. of the monoethyl ether of ethylene glycol, 300 cc. of toluene and 2 g. of ferric chloride are reacted, and the product worked up, as in Example I. The ethoxyethyl p-ethoxybenzoate formed boils at 147–150° C. at 1–2 mm. Hg pressure.

Methoxyethyl p-ethoxybenzoate (B. P. 141–146° C. at 2 mm.), the ethyl ether of diethylene glycol p-ethoxybenzoate (B. P. 165–170° C. at 1 mm.), benzyl p-ethoxybenzoate (B. P. 162–167° C. at 2 mm.) and tetrahydrofurfuryl p-ethoxybenzoate (B. P. 170–173° C. at 2 mm.) may be prepared in a similar manner, using the monomethyl ether of ethylene glycol, the monomethyl ether of diethylene glycol, benzyl alcohol and tetrahydrofurfuryl alcohol, respectively, in place of the monoethyl ether of ethylene glycol.

*Example IV.*—One gram molecule of 3:4:5-trimethoxybenzoic acid, one gram molecule of the monomethyl ether of ethylene glycol, 2 cc. of concentrated sulfuric acid and 400 cc. of benzene are reacted, and the product worked up, as in Example I. The methoxyethyl 3:4:5-trimethoxybenzoate formed boils at 180–185° C. at 1–2 mm. Hg pressure.

Ethoxyethyl 3:4:5-trimethoxybenzoate (B. P. 190–195° C. at 1–2 mm.) may be prepared in a similar manner, using the monoethyl ether of ethylene glycol in place of the monomethyl ether of ethylene glycol.

*Example V.*—One gram molecule of anisic acid is dissolved in its equivalent of 25% caustic soda solution, and the water removed under vacuum. The sodium anisate so obtained is dried at 120–130° C. for two hours. It is then stirred under reflux with an excess of ethylene chlorohydrin for 4–5 hours. The mixture is cooled, filtered from precipitated sodium chloride and distilled. Ethylene glycol monoanisate is obtained, boiling at 155–160° C. at 1 mm. Hg. pressure.

Ethylene glycol mono-o-methoxybenzoate (B. P. 140–160° C. at 1 mm.) and ethylene glycol mono-3:4:5-trimethoxybenzoate (B. P. 198–205° C. at 1 mm.) may be prepared in a similar manner, using o-methoxybenzoic acid and 3:4:5-trimethoxybenzoic acid, respectively, in place of anisic acid.

*Example VI.*—Two gram molecules of anisic acid and one gram molecule of diethylene glycol are dissolved in 1 liter of toluene. 2 cc. of concentrated sulfuric acid is added, and the solution is distilled, an azeotrope of toluene and water being distilled off, separated, and the toluene returned to the reaction flask. When the theoretical amount of water has been removed, the solution is cooled, neutralized with solid sodium carbonate, filtered, and distilled in vacuo. The diethylene glycol di-anisate formed melts at 60–62° C., and boils at 250–255° C. at 1 mm. Hg. pressure.

*Example VII.*—One gram molecule of o-methoxybenzoyl chloride (prepared from o-methoxybenzoic acid and thionyl chloride) is treated with an excess of cyclohexanol on the steam bath until the evolution of HCl ceases. The solution is then neutralized with sodium carbonate and distilled. The cyclohexyl o-methoxybenzoate formed boils at 120–125° C. at 1 mm.

The polyvinyl acetal resins can be prepared by reacting polyvinyl alcohol with an aldehyde in the presence of an acetal condensation catalyst, e. g., a mineral acid. These resins can also be prepared by simultaneously de-esterifying a polyvinyl aliphatic ester and reacting the de-esterification product with an aldehyde in the presence of a de-esterifying catalyst and acetal condensation catalyst. Mineral acids are catalysts for both de-esterification and acetal formation. Among the polyvinyl acetal resins with which our novel plasticizers are useful may be mentioned, as illustrative examples, the polyvinyl formaldehyde acetal resins, the polyvinyl acetaldehyde acetal resins, the polyvinyl formaldehyde acetaldehyde mixed acetal resins, the polyvinyl butyraldehyde acetal resins and the polyvinyl butyraldehyde acetaldehyde mixed acetal resins.

Examples of the preparation of polyvinyl formaldehyde acetal resins may be found in U. S. Patent 1,955,068, Examples 1, 4 and 5; in U. S. Patent 2,036,092, Examples 1, 2, 3, 7 and 8; in British Patent 454,691, Examples 1, 2, 3, 4, 5, 6 and 7; in British Patent 404,279, Example 3; and in British Patent 436,072, Examples 1, 2, 3, 4, 5, 6 and 7.

Examples of the preparation of polyvinyl acetaldehyde acetal resins may be found in U. S. Patent 2,044,730, Example 1; U. S. Patent 1,955,068, Example 2; U. S. Patent 2,036,092, Examples 4, 5 and 6; British Patent 466,598, Examples 1, 2, 3, 4 and 7; British Patent 404,279, Examples 1, 2, 4, 5, 6, 7 and 8; U. S. Patent 1,990,399; and French Patent 808,578, Examples 1, 2 and 3.

Examples of the preparation of polyvinyl formaldehyde acetaldehyde mixed acetal resins may be found in British Patent 430,136, Examples 1, 2, 3, 4, 5 and 6; British Patent 445,565, Example 2; British Patent 465,873, Examples 1, 2, 3, 4, 5, and 6; French Patent 808,586, Examples 1, 2, 3, 4, 5, 6, 12, 13, 14, 15, 16, 17, 18 and 19.

Examples of the preparation of polyvinyl butyraldehyde acetal resins may be found in U. S. Patent 2,044,730, Examples 2, 5 and 6; British Patent 466,598, Example 5; French Patent 813,303, Example 1; French Patent 813,514, Examples 1, 2, 3 and 4; and British Patent 459,878, Examples 1, 2, 5, 6, 7, 8, 9 and 10.

An example of the preparation of a polyvinyl butyraldehyde acetaldehyde mixed acetal resin is given in French Patent 813,303, Example 2.

What we claim as our invention and desire to be secured by Letters Patent of the United States is:

1. A composition of matter comprising a polyvinyl acetal resin and, as a plasticizer therefor, a lower alkoxybenzoic acid ester of a compound selected from the group consisting of ethylene and diethylene glycol and their lower monoalkyl ethers and the cyclic alcohols.

2. A composition of matter comprising a polyvinyl acetal resin and, as a plasticizer therefor, a lower alkoxybenzoic acid ester of a cyclic alcohol.

3. A composition of matter comprising a polyvinyl acetal resin and, as a plasticizer therefor, a lower alkoxybenzoic acid ester of a lower monoalkyl ether of ethylene glycol.

4. A composition of matter comprising a polyvinyl acetal resin and, as a plasticizer therefor, a lower alkoxybenzoic acid ester of a lower monoalkyl ether of diethylene glycol.

JAMES B. NORMINGTON.
FRED C. DUENNEBIER.